Aug. 24, 1937.  H. GARREAU  2,090,887
HEATING PLANT
Filed Oct. 15, 1931  4 Sheets-Sheet 3
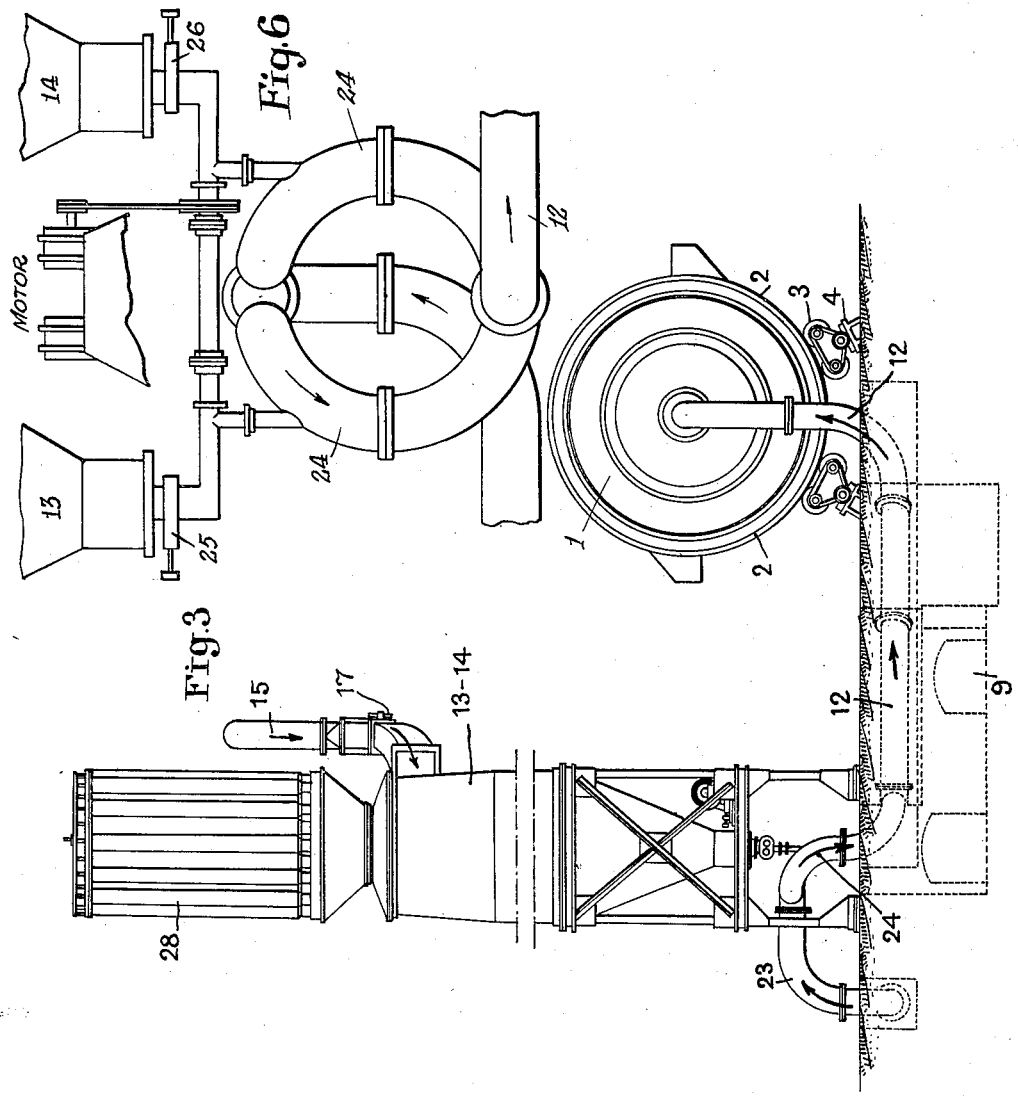
Inventor:
H. Garreau
by E. F. Wendexoth
Atty

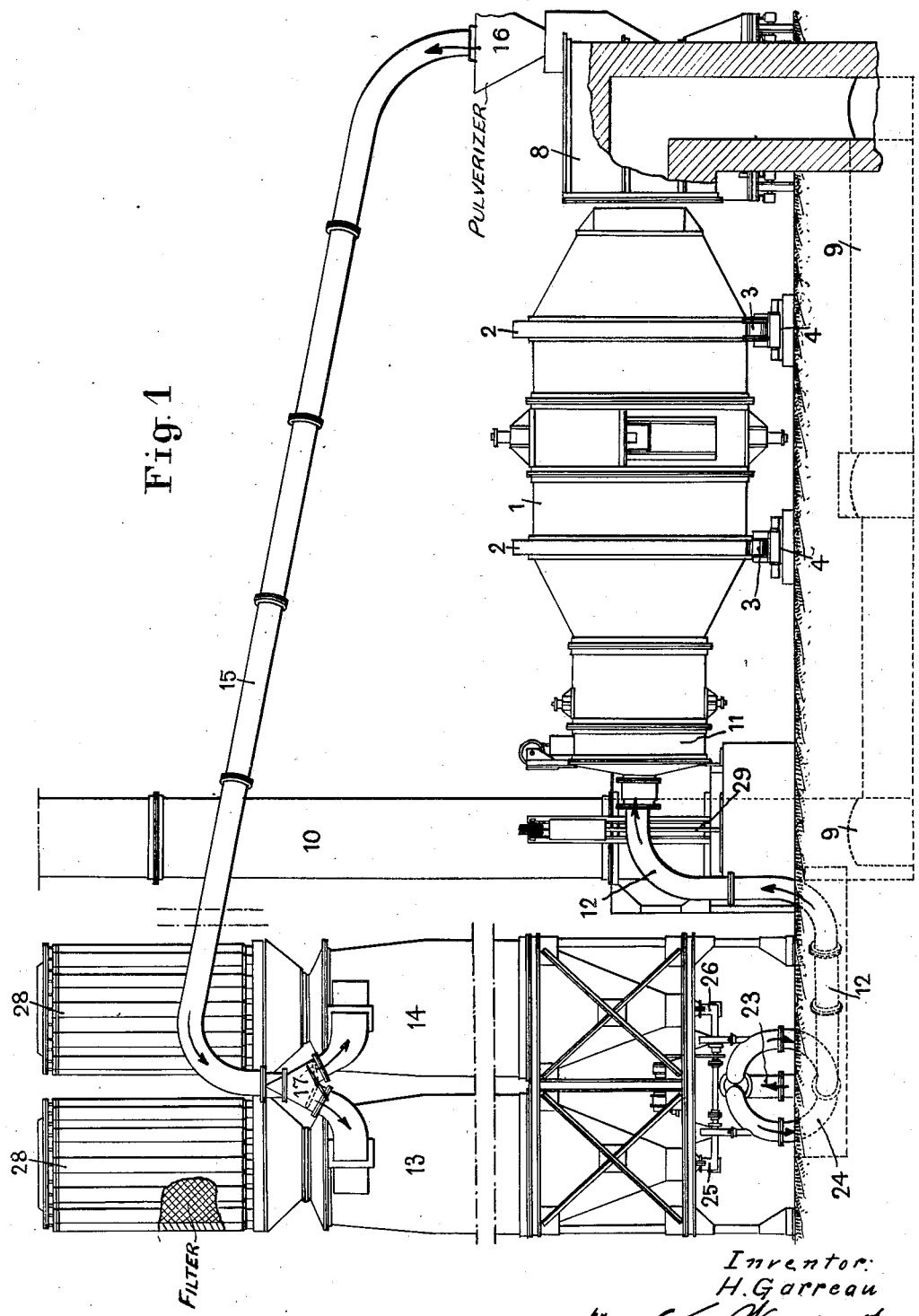

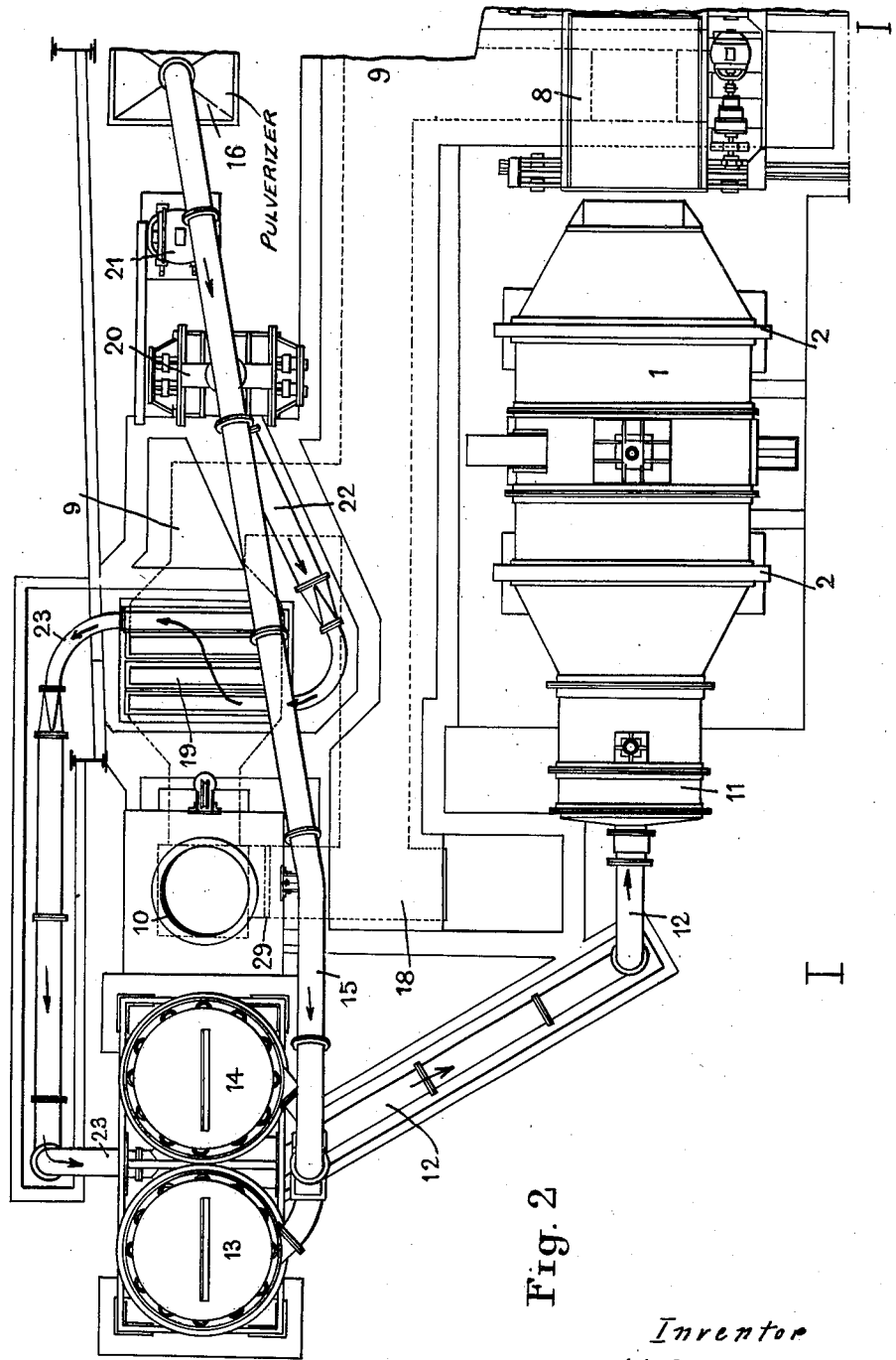

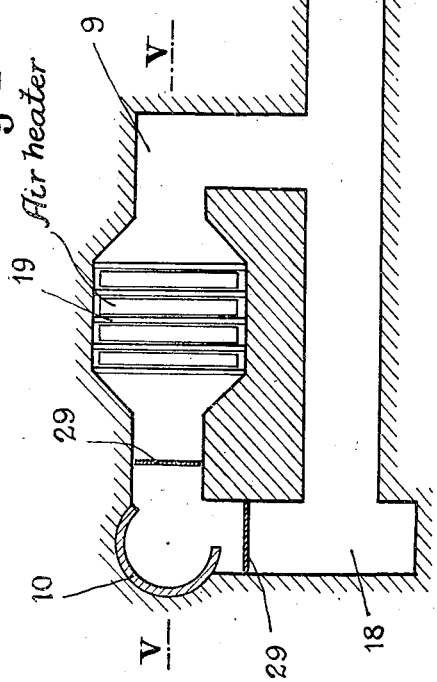
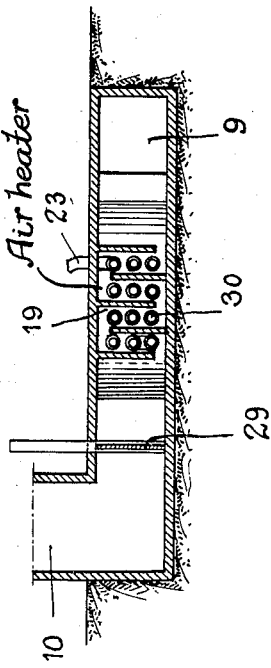

Patented Aug. 24, 1937

2,090,887

UNITED STATES PATENT OFFICE 2,090,887

HEATING PLANT

Henri Garreau, Paris, France, assignor to the firm Rotary Furnaces Limited, Brussels, Belgium Application October 15, 1931, Serial No. 569,024

1 Claim. (Cl. 110—28)

This invention has for its object improvements in plants for heating by means of powdered coal rotating furnaces for the thermic treatment of metals, ores and other substances.

It has already been proposed to heat rotating furnaces by means of powdered coal in order to allow such rotating furnaces to be used for the thermic treatment of metals, ores and other substances, but some arrangements of such character have the drawback not to permit the obtaining of sufficiently high temperatures, whilst on another hand, the thermic treatment cannot be effected with the desired accuracy owing to the difficulty of preventing the admission of additional air which is very difficultly controlled.

The plant or arrangement according to my invention which allows the obtaining of high accurately determined temperature with the desired atmosphere of the furnace, comprises more particularly a rotating furnace of any approved construction, the charging end of which is provided with a movable head which may bring the internal room of the furnace in communication either with the usual flue for the exhaust of burnt gases, or with the free air for the charging operation of the furnace, whilst the other end of such furnace is provided with a burner tightly connected with said furnace and conveniently fed with powdered coal through a group of hoppers which contain different fuels, such as for instance powdered lean coal and powdered bituminous coal, the air which is used for carrying such powdered coal to the burner being previously brought to a convenient temperature thus allowing the furnace to be easily fired and to operate at a high temperature.

In the accompanying drawings which show by way of example an embodiment of the plant according to my invention:—

Fig. 1 is a diagrammatic view of a plant used for the fusion of pig iron.

Fig. 2 is a plan view of the structure shown in Fig. 1.

Fig. 3 is a diagrammatic view of the structure shown in Fig. 1.

Figs. 4 and 5 show the means utilized for heating the air.

Fig. 6 is a partial view showing the construction at the bottom of the hoppers on an enlarged scale.

The rotating furnace 1 which may have any approved arrangement is carried by means of steel tires or rolling ways 2 upon rollers 3, which latter are journalled on a frame 4 of any desired arrangement. A motor not shown in the drawings controls the rotation of the furnace. As is well known, the movement of the furnace may be either rotating and continuous or preferably oscillating, the motor causing the furnace to turn now in one direction then in the opposed direction, such oscillations having at the maximum a complete revolution of the furnace.

Provided on the right end of the furnace as shown in Fig. 1 is a movable head 8 designed for the charging of the furnace through such end of said furnace. Said head may also bring the internal room of the furnace into communication with a flue 9 for the exhaust of the burnt gases, which flue is directly connected with a chimney shown at 10 (Fig. 2).

Provided at the opposite end of the furnace is a burner indicated in its entirety by 11 in Fig. 1, which burner has preferably the arrangement described and shown in my pending application, Serial No. 376,646 filed on July 8, 1929 for "Heating devices for furnaces and the like". Such burner is fed through a conduit 12 which brings to said burner the combustible mixture formed by powdered coal and air.

The powdered coal is contained in hoppers 13, 14, which contain long flame burning coal and short flame burning coal respectively, said coals being for instance bituminous coal and lean coal respectively. Said coal is sent into such hoppers 13, 14 through a conduit 15 which constitutes the delivering end of a pulverizing plant 16. Such pulverizing plant which may have any construction approved may receive several coals having conveniently different characters, such as for instance bituminous coal and lean coal which, once pulverized, are sent into the hopper 13 or into the hopper 14 according to their character, a convenient gate 17 being provided for that purpose on the conduit 15 for directing the delivered coal into the convenient hopper according to the character of the pulverized coal.

The flue 9 connecting with the chimney 10 has a by-pass 18 also connecting with the chimney 10. In the by-pass 18 a valve 29' is provided and in the flue 9 a valve 29. During the operation as a general rule, the valve 29 or the valve 29' is open while the other is closed, but in some instances both valves may be opened at the same time. Provided in a branch of the flue 9 is a heater 19 of any approved construction which it is useless to describe more completely here, owing to the fact that such heater per se is not a part of my invention. A blower 20 which is preferably constituted by a volumetric pump provided with an electric motor 21, forces through a canal 22 air into the heater 19 and the outlet of such heater is connected by a conduit 23 with a receiver 24 provided for both hoppers 13, 14, the powdered coal contained in such hoppers being in a position to flow away under the control of convenient valves 25, 26 which are diagrammatically shown in Fig. 1.

The receiver 24 is connected with a conduit 12 which feeds the burner 11 of the furnace 1.

As more particularly seen in Figs. 1 and 3, hoppers 13 and 14 are provided with filtering bags 28 of any desired substance which permit the escape of the air used for carrying the powdered coal and bringing same into said hoppers, the powdered coal being however securely kept inside such bags.

The operation is as follows:—

For firing the furnace, bituminous coal coming for instance from the hopper 13, is first sent into the burner and the flowing of the coal is permitted by the opened valve 25 whilst valve 26 is shut. The valve 29' being opened, the hot waste gases which go out of the furnace directly escape into the chimney 10 through the by-pass 18 without traversing the heater 19. The blower 20 consequently forces into the conduit 23 cold air which feeds through the conduit 12 the powdered coal for firing the burner, the whole air used for carrying the coal being used for securing the combustion of such coal.

The temperature inside said burner 11 having attained a value which may be verified by means of convenient peep-holes provided in any convenient place of the furnace or by any other means, the valve 25 is shut and the valve 26 is opened, thus causing lean coal which is finely pulverized to be brought into the receiver 24. The valve 29' is closed thus preventing the burnt gases from directly escaping into the chimney 10 through the by-pass 18; the whole mass of hot gases being thus compelled to pass through the heater 19. The air forced by the blower 20 receives in such heater a convenient quantity of heat bringing it to the desired temperature prior to its being sent into the conduit 12 carrying the short flame burning coal given by the hopper 14. The whole quantity of air used for carrying the powdered coal is used for the combustion of such coal, a combustion which is realized in the burner 11 without any addition of air.

Of course the pulverizer 16 receives a convenient quantity of coal to be pulverized, which coal may be brought to such pulverizer by means of a feeding device not shown in the drawings. Owing to the fact that such feeding device may have any convenient shape or arrangement, and does not make a part of my present invention, it is quite useless to show the same in the drawings and to further describe it.

The described arrangement thus permits, instantaneously passing from one character of fuel to another character, while providing the furnace at any time with the fuel which is the most favourable for obtaining the desired result, which allows an easy firing of the furnace while obtaining high temperatures which are necessary for some thermic treatments.

What I claim is:—

In a plant for heating rotating furnaces by means of powdered coal, a rotative furnace, a burner at one end of said furnace, a plurality of hoppers for coal having different characteristics, a conduit having communication with said hoppers and said burner, means controlling the supply of coal from any one of said hoppers to said conduit, means for supplying air to said conduit to transport the coal from said hoppers to said burner, a heater for said air, a flue conducting products of combustion from the furnace through said heater, a by-pass leading from the flue and encircling said heater and means for controlling the passage of combustion gases through said by-pass and through said heater.

HENRI GARREAU.